United States Patent
Tan et al.

(10) Patent No.: US 8,424,290 B2
(45) Date of Patent: Apr. 23, 2013

(54) METHOD AND SYSTEM FOR CONTROLLING AN ENGINE DURING DIESEL PARTICULATE FILTER REGENERATION AT IDLE CONDITIONS

(75) Inventors: Julian C. Tan, Canton, MI (US); John Zeilstra, Chicago, IL (US); Christoph Thoele, Holdorf (DE); Gustavo Tepedino, Ann Arbor, MI (US)

(73) Assignee: GM Global Technology Operations LLC

( * ) Notice: Subject to any disclaimer, the term of this patent is extended or adjusted under 35 U.S.C. 154(b) by 373 days.

(21) Appl. No.: 12/713,328

(22) Filed: Feb. 26, 2010

(65) Prior Publication Data

US 2011/0209463 A1   Sep. 1, 2011

(51) Int. Cl.
*F01N 3/22* (2006.01)
(52) U.S. Cl.
USPC ............. 60/285; 60/274; 60/278; 60/295; 60/297; 60/311
(58) Field of Classification Search ........... 60/274, 60/278, 285, 295, 297, 311
See application file for complete search history.

(56) References Cited

U.S. PATENT DOCUMENTS

| 7,293,410 | B2 * | 11/2007 | Miura ........................ 60/295 |
| 2003/0033800 | A1 * | 2/2003 | Tonetti et al. ................ 60/286 |
| 2004/0123589 | A1 * | 7/2004 | Ohtake et al. ............... 60/295 |
| 2005/0060991 | A1 * | 3/2005 | Tsutsumoto et al. ......... 60/295 |
| 2005/0060992 | A1 * | 3/2005 | Kogo et al. ................. 60/311 |
| 2006/0096280 | A1 * | 5/2006 | Zhan et al. .................. 60/297 |
| 2007/0193258 | A1 * | 8/2007 | Berke ......................... 60/297 |
| 2008/0016855 | A1 * | 1/2008 | Kogo et al. ................. 60/295 |
| 2009/0019838 | A1 * | 1/2009 | Marlett et al. .............. 60/287 |
| 2009/0288398 | A1 * | 11/2009 | Perfetto et al. ............. 60/287 |
| 2011/0107741 | A1 * | 5/2011 | LaRose et al. .............. 60/276 |

FOREIGN PATENT DOCUMENTS

DE   102004044732 A1   3/2006

OTHER PUBLICATIONS

Office Action dated Oct. 18, 2012 from the German Patent Office for German Patent Application No. DE 102011011841.1.

\* cited by examiner

*Primary Examiner* — Thomas Denion
*Assistant Examiner* — Jorge Leon, Jr.

(57) ABSTRACT

A method and control system for controlling an engine during diesel particulate filter regeneration includes a diesel particulate filter (DPF) regeneration request module that generates a DPF regeneration request signal and an idle condition module that generates an idle condition signal when the engine is at an idle condition. A DPF regeneration control module initiates a timer in response to the DPF regeneration request signal and the idle condition signal. The DPF regeneration control module controls the engine oxygen level to a second level less than a first level corresponding to a non-idle speed level, and after a time period, controls the engine to generate oxygen at a third level greater than the second level.

19 Claims, 4 Drawing Sheets

METHOD AND SYSTEM FOR CONTROLLING AN ENGINE DURING DIESEL PARTICULATE FILTER REGENERATION AT IDLE CONDITIONS

FIELD

The present disclosure relates to vehicle exhaust systems and, more particularly, to controlling the engine at idle during diesel particulate filter (DPF) regeneration.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Diesel engine operation involves combustion that generates exhaust gas. During combustion, an air/fuel mixture is delivered through an intake valve to cylinders and is combusted therein. After combustion, the piston forces the exhaust gas in the cylinders into an exhaust system. The exhaust gas may contain emissions such as oxides of nitrogen ($NO_x$) and carbon monoxide (CO).

More and more exhaust hardware technology is being added to meet emissions on diesel applications. After treatment of exhaust gases includes the installation of multiple bricks, mixers and injectors for the exhaust stream. A diesel particulate filter is regenerated periodically to reduce the amount of soot therein. During diesel particulate filter regeneration, if the vehicle is stopped and put into park or neutral, the diesel particulate filter regeneration goes into a rich-idle state. In this state, the amount of oxygen in the exhaust is limited to protect the diesel particulate filter. Initially, the oxygen must be kept low to protect the diesel particulate filter. Restricting the amount of oxygen in the exhaust may strain the engine which may be perceived by the driver. Fuel consumption is increased during the rich-idle state. Also, the engine operates near misfire during the rich-idle state. Misfire may also be perceived by the driver.

SUMMARY

Accordingly, the present disclosure provides for a system and method for allowing more oxygen in the exhaust after a time period during an engine idle state. This allows the regeneration to continue at idle in a controlled manner rather than aborting the regeneration process completely.

In one aspect of the disclosure, a control system includes a diesel particulate filter (DPF) regeneration request module that generates a DPF regeneration request signal and an idle condition module that generates an idle condition signal when the engine is at an idle condition. A DPF regeneration control module initiates a timer in response to the DPF regeneration request signal and the idle condition signal. The DPF regeneration control module controls the engine oxygen level to a second level less than a first level corresponding to a non-idle speed level, and after a time period, controls the engine to generate oxygen at a third level greater than the second level.

In another aspect of the disclosure, a method includes entering a diesel particulate filter (DPF) regeneration cycle, generating oxygen in an exhaust at a first level, when the engine is in an idle state and a DPF is within the regeneration cycle, initiating a timer and generating oxygen in the exhaust at a second level and after a time period, controlling the engine to generate oxygen at a third level greater than the second level.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

DETAILED DESCRIPTION OF THE PREFERRED EMBODIMENTS

Figure 1:
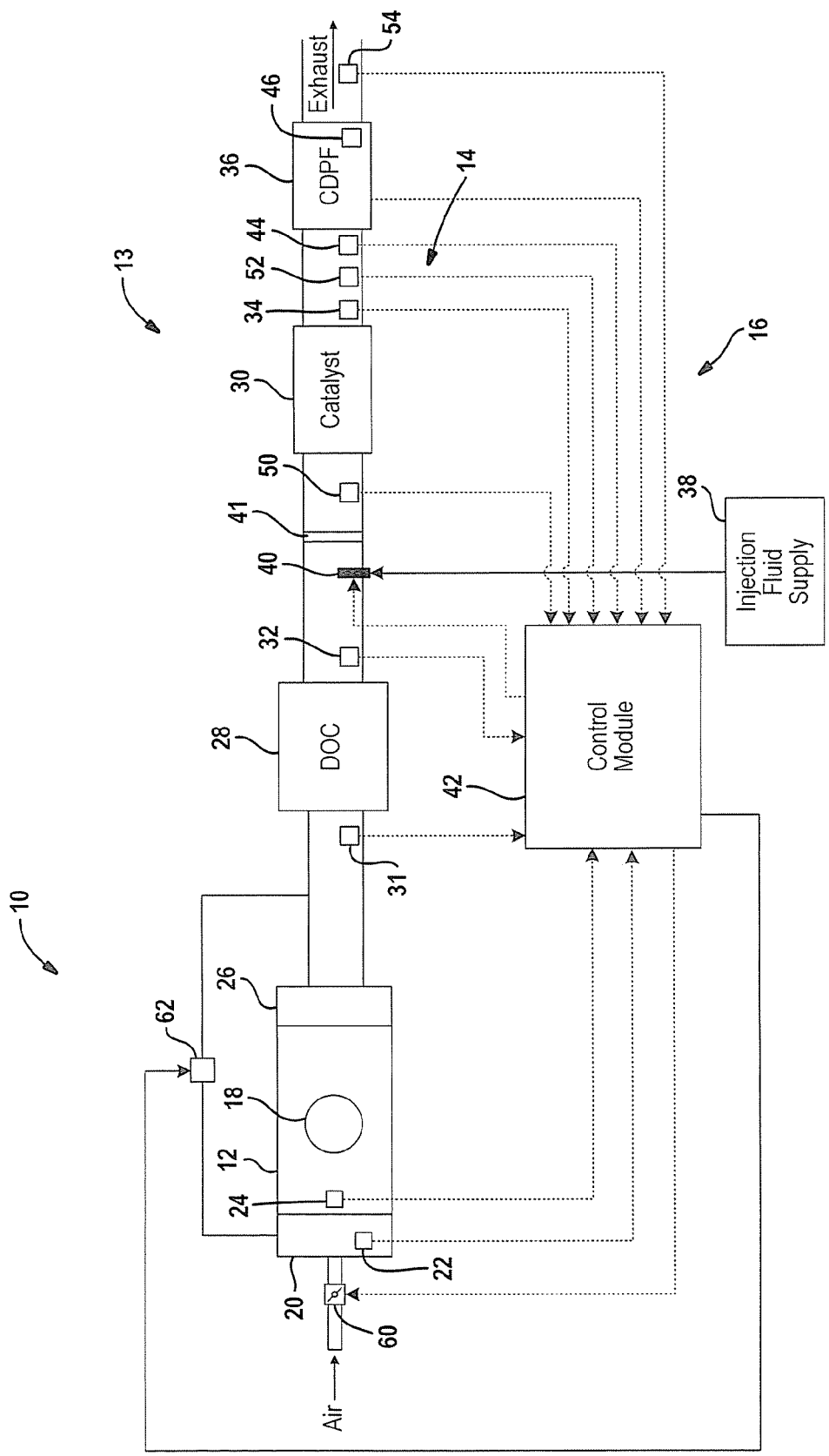
FIG. 1 is a functional block diagram of an engine system including an exhaust treatment system with temperature sensors integrated within a catalyst according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, and/or a combinational logic circuit that provide(s) the described functionality.

While the following disclosure is set forth for diesel engines, other types of engines such as gasoline engines, including direct injection engines, may benefit from the teachings herein.

Referring now to FIG. 1, a diesel engine system 10 is schematically illustrated. The diesel engine system 10 includes a diesel engine 12 and an exhaust treatment system 13. The exhaust treatment system 13 further includes an exhaust system 14 and a dosing system 16. The diesel engine 12 includes a cylinder 18, an intake manifold 20, a mass air flow (MAF) sensor 22 and an engine speed sensor 24. Air flows into the engine 12 through the intake manifold 20 and is monitored by the MAF sensor 22. The air is directed into the cylinder 18 and is combusted with fuel to drive pistons (not shown). Although a single cylinder 18 is illustrated, it can be appreciated that the diesel engine 12 may include additional cylinders 18. For example, diesel engines having 2, 3, 4, 5, 6, 8, 10, 12 and 16 cylinders are anticipated.

Exhaust gas is produced inside the cylinder 18 as a result of the combustion process. The exhaust system 14 treats the exhaust gas before releasing the exhaust gas to the atmosphere. The exhaust system 14 includes an exhaust manifold 26 and a diesel oxidation catalyst (DOC) 28. The exhaust manifold 26 directs exhaust exiting the cylinder towards the DOC 28. The exhaust is treated within the DOC 28 to reduce the emissions. The exhaust system 14 further includes a catalyst 30, such as a selective catalyst reducing (SCR) catalyst, a temperature sensor 31, an inlet temperature sensor 32, an outlet temperature sensor 34 and catalyzed diesel particulate filter (CDPF) 36. The DOC 28 reacts with the exhaust gas prior to treating the exhaust to reduce emission levels of the exhaust. The catalyst 30 reacts subsequent to treating the exhaust to further reduce emissions.

The temperature sensor 31 may be positioned between the engine and the DOC 28. The inlet temperature sensor 32 is located prior to the catalyst 30 to monitor the temperature change at the inlet of the catalyst 30, as discussed further below. The outlet temperature sensor 34 is located after the catalyst to monitor the temperature change at the outlet of the catalyst 30, as discussed further below. Although the exhaust treatment system 13 is illustrated as including the inlet and outlet temperature sensors 32, 34 as being outside the catalyst 30, the inlet and outlet temperature sensors 32, 34 can be located internally with the catalyst to monitor the temperature change of the exhaust at the inlet and outlet of the catalyst. The CDPF 36 further reduces emissions by trapping diesel particulates (i.e., soot) within the exhaust.

The dosing system 16 includes an injection fluid supply 38 that may be used for injecting urea from a tank and a dosing injector 40. The dosing system 16 injects injection fluid such as urea into the exhaust. The urea mixes with the exhaust and further reduces the emissions when the exhaust/urea mixture is exposed to the catalyst 30. A mixer 41 is used to mix the injection fluid such as urea with the exhaust gasses prior to the exhaust gases entering the catalyst.

A control module 42 regulates and controls the operation of the engine system 10 and monitors operation of the dosing system 16.

An exhaust gas flow rate sensor 44 may generate a signal corresponding to the flow of exhaust in the exhaust system. Although the sensor is illustrated between the catalyst 30 and the CDPF 36, various locations within the exhaust system may be used for measurement including after the exhaust manifold and before the catalyst 30.

A temperature sensor 46 generates a particulate filter temperature sensor signal that corresponds to a measured particulate filter temperature. The temperature sensor 46 may be disposed on or within the diesel particulate filter 36. The temperature sensor 46 may also be located just after or just before the diesel particulate filter relative to the exhaust stream. The temperature sensor 46 communicates a measured particulate filter temperature signal to the control module 42.

Other sensors in the exhaust system may include a NOx sensor 50 which generates a signal corresponding to the amount of oxides of nitrogen in the exhaust system. This may be referred to as NOx—In since this sensor is upstream of the catalyst. A NOx-Out sensor 52 may be positioned downstream such as after the SCR 30 for generating a signal corresponding to the oxides of nitrogen leaving the SCR. In addition, an ammonia ($NH_3$) sensor 54 generates a signal corresponding to the amount of ammonia within the exhaust stream.

The control module 42 may be used to control an electronic throttle 60 and an exhaust gas recirculation (EGR) valve 62 that recirculates exhaust gases into the intake manifold 20. The electronic throttle 60 and EGR valve 62 may be controlled to change the oxygen level in the exhaust gases.

The control module 42 may control the exhaust conditions and regeneration of the diesel particulate filter. Further details of the control module 42 and the exhaust control module 60 are provided below.

Figure 2:
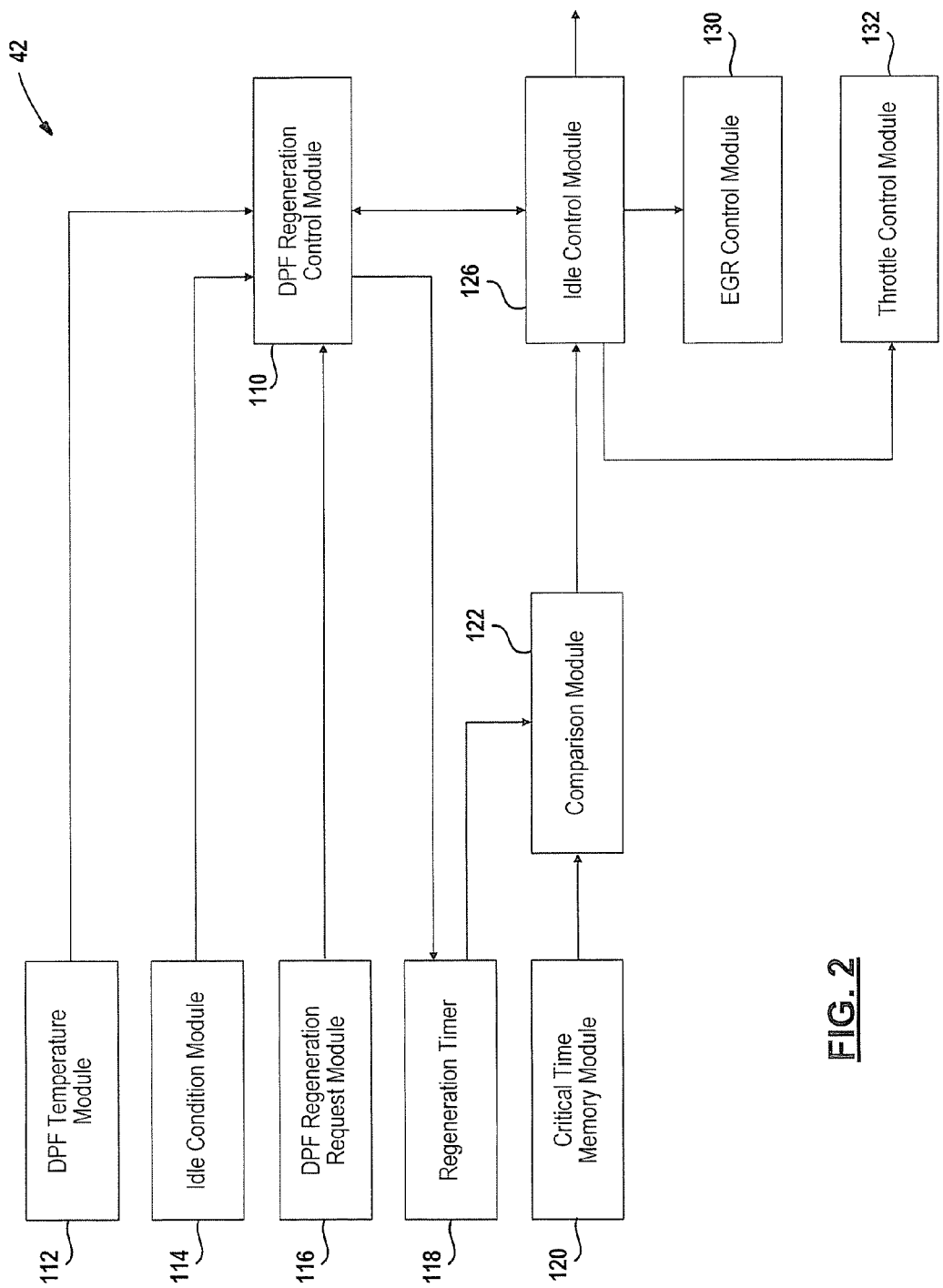
FIG. 2 is a functional block diagram of the controller of FIG. 1.

Referring now to FIG. 2, the control module 42 may include a diesel particulate filter (DPF) regeneration control module 110. The DPF regeneration control module 110 may receive signals from various other modules. The DPF regeneration control module 110 may receive a temperature signal from a DPF temperature module 112. The DPF temperature module 112 may generate a temperature signal corresponding to the temperature in the diesel particulate filter. The diesel particulate filter may include a temperature sensor therein. The exhaust system may also include a temperature sensor either before or after the diesel particulate filter. The temperature signal may also be generated based upon an estimate of the engine operating conditions.

An idle condition module 114 may also be in communication with the diesel particulate filter regeneration control module 110. The idle condition module 114 may generate a signal corresponding to whether the engine is at an idle condition. The engine may be at an idle condition when the vehicle is in park or neutral. The engine may also be in idle condition when the vehicle is stopped.

A diesel particulate filter (DPF) regeneration request module 116 may generate a DPF regeneration request signal. The DPF regeneration request signal may be communicated to the DPF regeneration control module 110. The DPF regeneration signal may initiate a diesel particulate filter regeneration.

The diesel particulate filter regeneration control module 110 may activate a regeneration timer 118 in response to the initiation of a regeneration time period. The regeneration time may be the time since the initiation of the regeneration cycle. A critical time memory module 120 may also be included within the control module 42. A critical time control module may provide a critical time period to a comparison module 122. The regeneration timer signal may also be provided to the comparison module 122. The comparison module 122 compares the regeneration time and the critical time and controls the engine in response thereto. The comparison module 122 may control an idle control of the engine through the idle control module 126. It should be noted that the idle control module 126 may also control the idle and the amount of exhaust gas oxygen in response to entering a diesel particulate filter regeneration control cycle. The idle control module 126 may be in communication with various other engine components such as the EGR control module 130 and the throttle control module 132. The idle control module 126 may generate control signals to obtain a predetermined amount of engine exhaust oxygen. Both the EGR control module 130 and the throttle control module 132 may be controlled to control the amount of engine exhaust oxygen. Of course, other vehicle components may be used to control the exhaust gas oxygen.

Figure 3:
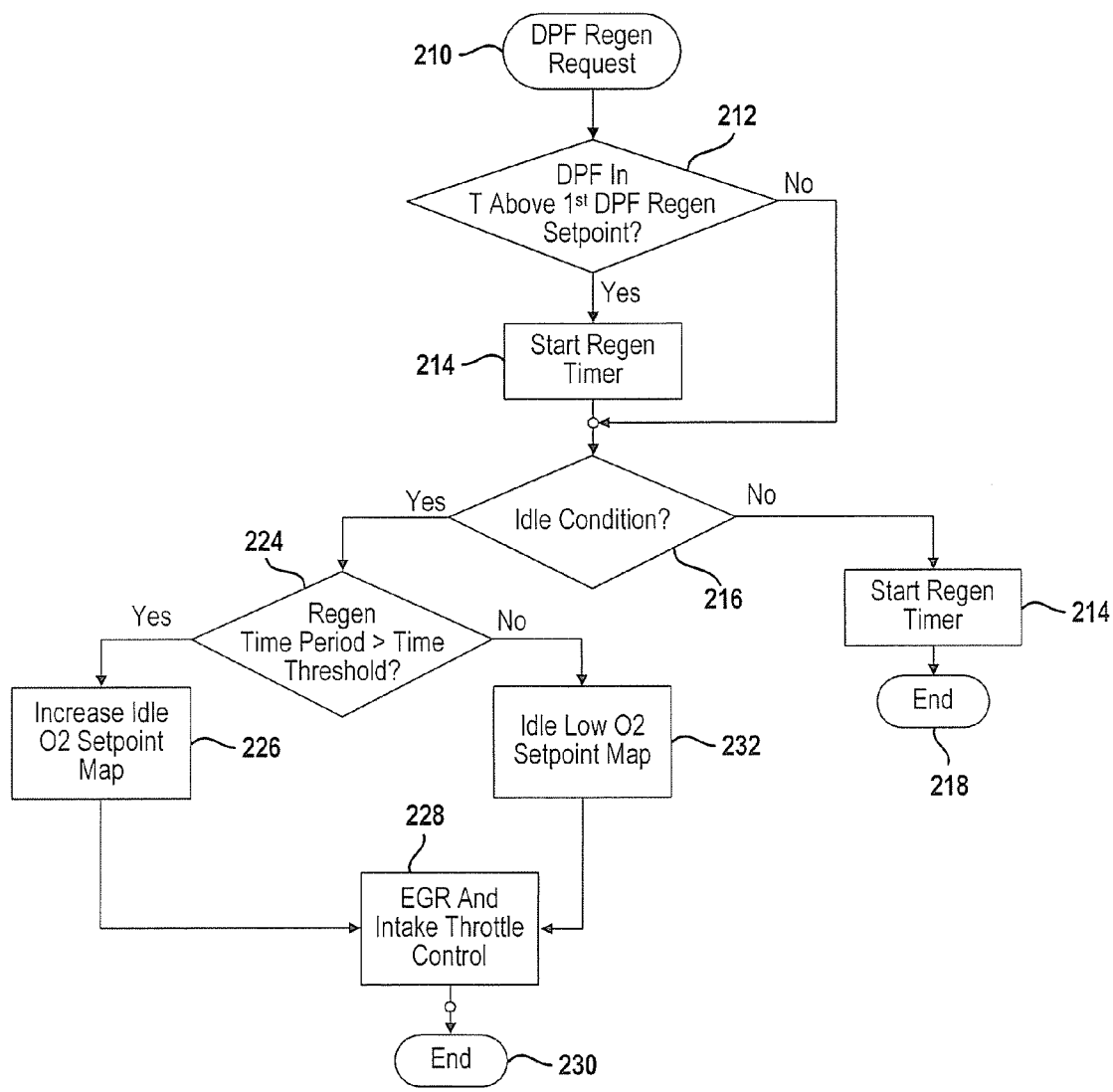
FIG. 3 is a flowchart of a method for controlling the system.

Referring now to FIG. 3, a method for controlling the engine during regeneration is set forth. In step 210, a diesel particulate filter regeneration request is generated. Various conditions such as soot buildup may necessitate regeneration. In step 212, a diesel particulate filter temperature is compared to a diesel particulate filter regeneration set point. When the temperature is above the diesel particulate filter regeneration set point, step 214 is performed. In step 212, if the temperature is not above the diesel particulate filter regeneration set point, step 214 is skipped and step 216 is entered. In step 216, it is determined whether an idle condition exists. If an idle condition does not exist, the present method does not apply and step 218 is performed which initiates a non-idle DPF regeneration strategy. After step 218, the system ends in step 220.

Referring back to step 216, when the engine is in an idle condition, step 224 determines whether the regeneration duration as provided by the regeneration timer is greater than a time threshold. When the regeneration time period is greater than a time threshold, step 226 increases the idle oxygen set point. This may be done by increasing the engine oxygen from a map. After step 226, step 228 control the EGR and intake throttle to obtain the oxygen set point. After step 228, step 230 is performed.

Referring back to step 224, the time period or duration since the initiation of the regeneration cycle is compared to a critical time. When the regeneration time period is not greater than the time threshold, the engine exhaust oxygen is controlled to an idle low set point in step 232. After step 232, the low engine idle exhaust set point may be controlled by the EGR and intake throttle control of step 228 as is described above.

Figure 4:
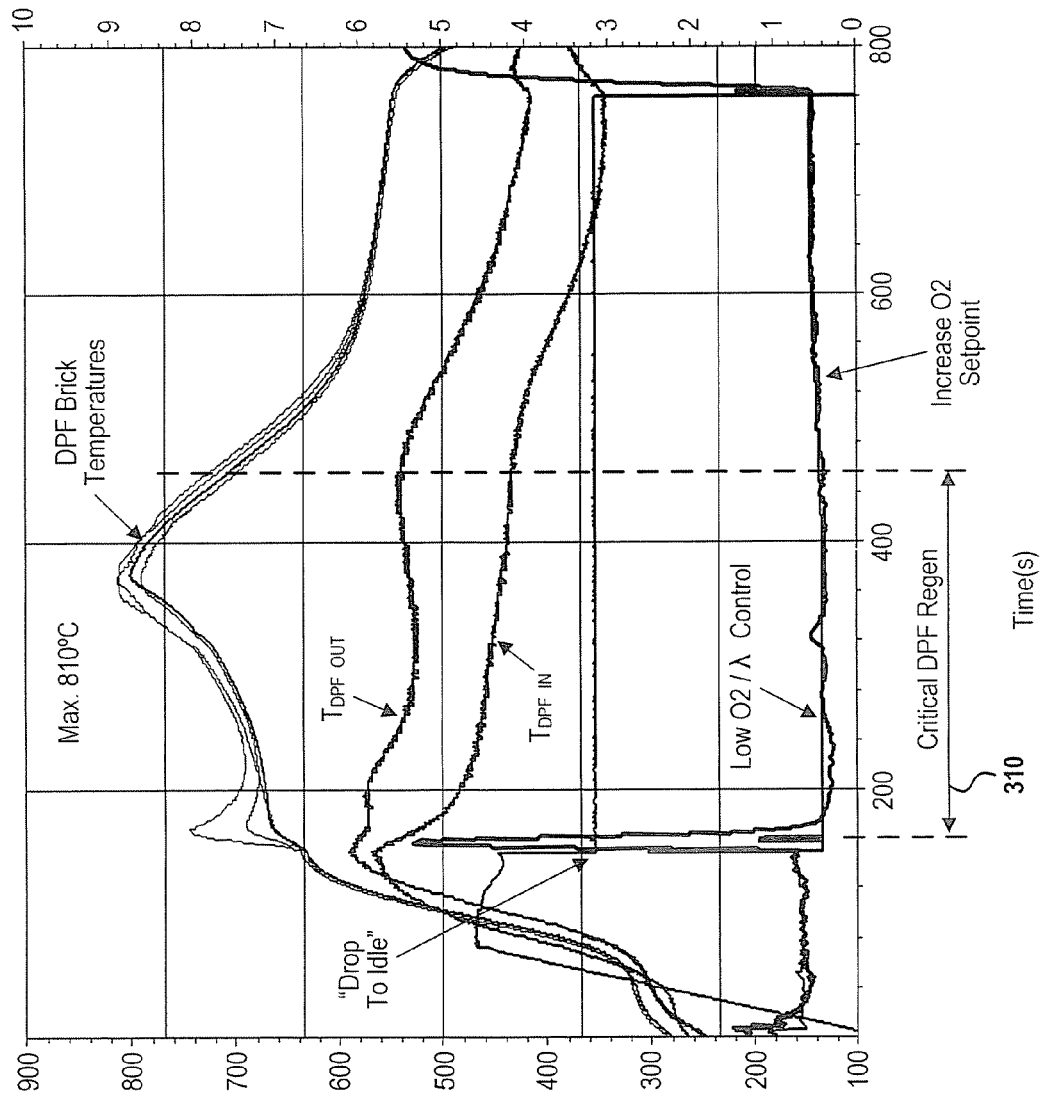
FIG. 4 is a plot of the oxygen level, the temperature input to the diesel particulate filter, the temperature output of the diesel particulate filter, the DPF particulate filter brick temperatures and a critical diesel particulate filter regeneration time.

Referring now to FIG. 4, a plot of critical DPF regeneration period 310 is illustrated. A drop to idle point is illustrated at the initiation of the critical DPF regeneration period. The temperature of the input to the diesel particulate filter ($T_{DPF,IN}$) and the output of the diesel particulate filter ($T_{DPF,OUT}$) are illustrated. The diesel particulate filter brick temperatures are also illustrated. An increase oxygen set point is illustrated whereby the oxygen is increased after a predetermined amount of time so that the diesel particulate filter brick temperature is maintained above a predetermined level for the regeneration process to continue.

By controlling the exhaust oxygen level, the customer experience is improved by reducing the EGR cooler fouling, increasing the fuel economy and reducing the amount of engine misfire.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A method comprising:
   entering a regeneration cycle of a diesel particulate filter (DPF);
   generating oxygen in exhaust of an engine at a first level;
   during the regeneration cycle of the DPF:
     starting a timer having a timer value in response to a determination that a DPF temperature is greater than a predetermined temperature;
     generating oxygen in the exhaust at a second level in response to determinations that the timer value is less than a predetermined value and the engine is in an idle state, wherein the second level is one of equal to and different than the first level; and
     controlling the engine to generate oxygen in the exhaust at a third level greater than the second level in response to a determination that the timer value is greater than the predetermined value.

2. A method as recited in claim 1 wherein the second level is less than the first level.

3. A method as recited in claim 1 further comprising, during the regeneration cycle of the DPF controlling the engine to a rich idle state in response to the determinations that the timer value is less than the predetermined value and the engine is in an idle state.

4. A method as recited in claim 1 further comprising, when the engine is in the idle state during the regeneration cycle of the DPF, discontinuing the regeneration cycle of the DPF.

5. A method as recited in claim 1 further comprising continuing the regeneration cycle of the DPF after the timer value is greater than the predetermined value.

6. A method as recited in claim 1 wherein the first level is equal to the third level.

7. A method as recited in claim 1 further comprising controlling exhaust gas recirculation in response to the third level.

8. A method as recited in claim 1 further comprising controlling an intake throttle in response to the third level.

9. A method as recited in claim 1 further comprising controlling an intake throttle and exhaust gas recirculation in response to the third level.

10. A control system for an engine comprising:
    a first electronic circuit configured to request initiation of a regeneration cycle of a diesel particulate filter (DPF);
    a second electronic circuit configured to generate an idle condition signal when the engine is in an idle state; and
    a third electronic circuit configured to, during the regeneration cycle of the DPF:
      start a timer having a timer value in response to a determination that a DPF temperature is greater than a predetermined temperature;
      generate oxygen in exhaust of the engine at a second level that is less than a first level in response to determinations that the timer value is less than a predetermined value and generation of the idle condition signal; and
      control the engine to generate oxygen at a third level greater than the second level in response to a determination that the timer value is greater than the predetermined value.

11. A control system as recited in claim 10 further comprising a fourth electronic circuit configured to control the engine to reduce oxygen in the exhaust when the engine is in the idle state during the regeneration cycle of the DPF.

12. A control system as recited in claim 10 further comprising a fourth electronic circuit configured to control the engine to a rich idle state when the engine is in the idle state and the timer value is less than the predetermined value during the regeneration cycle of the DPF.

13. A control system as recited in claim 10 wherein the third electronic circuit is configured to discontinue the regeneration cycle of the DPF when the engine is in the idle state during the regeneration cycle of the DPF.

14. A control system as recited in claim 13 wherein the third electronic circuit is configured to continue the regeneration cycle of the DPF after the timer value is greater than the predetermined value.

15. A control system as recited in claim 10 wherein the first level is equal to the third level.

16. A control system as recited in claim 10 further comprising a fourth electronic circuit configured to control exhaust gas recirculation in response to the third level.

17. A control system as recited in claim 10 further comprising a fourth electronic circuit configured to control an intake throttle in response to the third level.

18. A control system as recited in claim 10 further comprising:
    a fourth electronic circuit configured to control exhaust gas recirculation in response to the third level; and
    a fifth electronic circuit configured to control an intake throttle in response to the third level.

19. The control system of claim 10 wherein the first, second, and third electronic circuits include at least one of an Application Specific Integrated Circuit (ASIC), a processor and memory including one or more programs, and a combinational logic circuit.

\* \* \* \* \*